(12) United States Patent
Balogh

(10) Patent No.: US 8,836,544 B1
(45) Date of Patent: Sep. 16, 2014

(54) MULTIFUNCTIONAL DISPLAYS AND DISPLAY SYSTEMS FOR MARINE VESSELS

(75) Inventor: Daniel J. Balogh, Menasha, WI (US)

(73) Assignee: Brunswick Corporation, Lake Forest, IL (US)

( * ) Notice: Subject to any disclaimer, the term of this patent is extended or adjusted under 35 U.S.C. 154(b) by 269 days.

(21) Appl. No.: 13/396,439

(22) Filed: Feb. 14, 2012

Related U.S. Application Data

(60) Provisional application No. 61/443,744, filed on Feb. 17, 2011.

(51) Int. Cl.
*B60Q 1/00* (2006.01)
*G08B 23/00* (2006.01)
*G08G 3/00* (2006.01)
*G08B 21/00* (2006.01)
*B63H 25/36* (2006.01)
*B60L 11/00* (2006.01)
*B60L 3/00* (2006.01)
*G06G 7/70* (2006.01)

(52) U.S. Cl.
USPC ........... 340/984; 340/439; 340/455; 340/459; 340/461; 340/985; 340/986; 340/987; 701/22; 701/432; 701/114

(58) Field of Classification Search
CPC  B60K 2350/00; B60H 1/00392; B60L 11/12; B60R 25/1003; B60R 25/1004; B60R 25/1018; B60R 16/0315; B60R 1/12; B60R 1/1207; B60R 2001/1223; B60R 2001/1261; B60R 2001/1284; B60R 2325/205; B60R 25/102; B60R 25/1025; B60R 25/33
USPC ............. 340/905, 439, 461, 985; 701/22, 114
See application file for complete search history.

(56) References Cited

U.S. PATENT DOCUMENTS

| | | | | |
|---|---|---|---|---|
| 5,422,625 | A * | 6/1995 | Sakaemura | 340/461 |
| D378,500 | S * | 3/1997 | Nakai et al. | D10/125 |
| 6,480,106 | B1 * | 11/2002 | Crombez et al. | 340/461 |
| 6,794,853 | B2 | 9/2004 | Kondo et al. | |
| 7,143,363 | B1 * | 11/2006 | Gaynor et al. | 715/771 |
| 7,241,192 | B2 * | 7/2007 | Andersen et al. | 440/1 |
| 7,444,213 | B2 * | 10/2008 | Motose | 701/21 |

(Continued)

FOREIGN PATENT DOCUMENTS

| | | | | |
|---|---|---|---|---|
| EP | 1953022 A1 * | 8/2008 | | B60L 11/14 |
| EP | 2 159 098 A1 | 3/2010 | | |

(Continued)

*Primary Examiner* — Steven Lim
*Assistant Examiner* — Muhammad Adnan
(74) *Attorney, Agent, or Firm* — Andrus Intellectual Property Law LLP

(57) ABSTRACT

Multifunctional displays for a marine vessel having a propulsion system can include a sequential indicator, a first portion, a second portion and a transition portion between the first portion and the second portion. The first portion depicts changes in a characteristic of a first component of the propulsion system during a first operational mode of the propulsion system. The second portion depicts changes in a characteristic of a second component of the propulsion system during a second operational mode of the propulsion system. The transition portion depicts a change in operation of propulsion system between the first operational mode and the second operational mode. A marine vessel icon has first and second icons depicting changes in characteristics of the first and second components. The icon changes position when the operational mode of the marine vessel changes.

29 Claims, 14 Drawing Sheets

(56) References Cited

U.S. PATENT DOCUMENTS

| | | | |
|---|---|---|---|
| 7,474,309 B2 | 1/2009 | Kolpasky et al. | |
| 7,710,252 B2 * | 5/2010 | Kaya | 340/459 |
| 7,853,391 B2 * | 12/2010 | Komeda et al. | 701/99 |
| 7,898,405 B2 * | 3/2011 | Burke et al. | 340/461 |
| 7,963,656 B2 * | 6/2011 | Kuno et al. | 353/14 |
| 8,058,982 B2 | 11/2011 | Crowe et al. | |
| 8,068,974 B2 * | 11/2011 | Newhouse et al. | 701/123 |
| 8,359,153 B2 * | 1/2013 | Jinno | 701/123 |
| 8,477,022 B2 * | 7/2013 | Taguchi et al. | 340/439 |
| 2004/0216636 A1 | 11/2004 | Emori et al. | |
| 2005/0128065 A1 * | 6/2005 | Kolpasky et al. | 340/461 |
| 2005/0212669 A1 * | 9/2005 | Ono et al. | 340/461 |
| 2007/0208468 A1 | 9/2007 | Sankaran et al. | |
| 2007/0268157 A1 * | 11/2007 | Hess et al. | 340/932.2 |
| 2008/0042821 A1 * | 2/2008 | Kaya | 340/459 |
| 2009/0040033 A1 * | 2/2009 | Uchida | 340/439 |
| 2010/0052888 A1 * | 3/2010 | Crowe et al. | 340/461 |
| 2010/0144219 A1 | 6/2010 | Balogh et al. | |
| 2011/0090074 A1 * | 4/2011 | Kuno et al. | 340/438 |
| 2011/0095878 A1 | 4/2011 | Skaff et al. | |
| 2011/0208389 A1 | 8/2011 | Tarte | |
| 2011/0241859 A1 * | 10/2011 | Handa | 340/438 |
| 2011/0320088 A1 | 12/2011 | Eom et al. | |
| 2012/0188068 A1 * | 7/2012 | Hanna et al. | 340/441 |
| 2013/0127608 A1 * | 5/2013 | Ishikawa et al. | 340/425.5 |
| 2013/0166159 A1 * | 6/2013 | Kondoh | 701/51 |

FOREIGN PATENT DOCUMENTS

| | | | |
|---|---|---|---|
| EP | 2159097 A1 * | 3/2010 | G07C 5/08 |
| JP | 09-107601 A | 4/1997 | |
| JP | 11-208313 A | 8/1999 | |
| JP | 2001-231109 A | 8/2001 | |
| JP | 2002-247706 A | 8/2002 | |
| WO | 2006/085193 A1 | 8/2006 | |

* cited by examiner

US 8,836,544 B1

MULTIFUNCTIONAL DISPLAYS AND DISPLAY SYSTEMS FOR MARINE VESSELS

CROSS-REFERENCE TO RELATED APPLICATION

The present application relates to and claims priority of U.S. Provisional Application Ser. No. 61/443,744, filed Feb. 17, 2011, the disclosure of which is incorporated herein by reference in entirety.

FIELD

The present disclosure is generally related to displays and display systems for marine vessel propulsion systems.

BACKGROUND

A typical marine vessel has one or more internal combustion engines that drive a propulsor, such as for example a propeller, impeller, pod drive, stern drive, outboard and/or the like. One or more internal combustion engines provide thrust necessary to propel the vessel.

Some marine vessels also include one or more electric motors, which are typically battery powered motors utilized for trolling.

Other marine vessels utilize propulsion systems that connect both an internal combustion engine and an electric motor to a propulsor in torque-transmitting relation so that the propulsor can selectively receive a sum of the torque provided by the engine and motor. This is typically referred to as a "hybrid" propulsion system, such as is disclosed in abandoned U.S. patent application Ser. No. 11/505,075, the disclosure of which is expressly incorporated herein by reference.

In each of the above-referenced marine propulsion systems, one or more displays and related display systems usually are provided for conveying operational characteristics of the respective propulsion system to an operator of the marine vessel.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some examples, a multifunctional display for a marine vessel having a propulsion system is provided. The multifunctional display has a sequential indicator with a first portion, a second portion, and a transition portion between the first portion and the second portion. The first portion depicts changes in a characteristic of a first component of the propulsion system during a first operational mode of the propulsion system. The second portion depicts changes in a characteristic of a second component of the propulsion system during a second operational mode of the propulsion system. The transition portion depicts changes in operation of the propulsion system between the first operational mode and the second operational mode.

In some examples, a multifunctional display for a marine vessel has a marine vessel icon with a first icon depicting changes in a characteristic of a first component of the propulsion system during a first operational mode of the propulsion system, and a second icon depicting changes in a characteristic of a second component of the propulsion system during a second operational mode of the propulsion system. The marine vessel icon changes position on the display when the propulsion system changes from one of the first operational mode and second operational mode to the other of the first operational mode and second operational mode.

In the illustrated example, the propulsion system is a hybrid propulsion system, wherein the noted first component is an electric motor and the noted second component is an internal combustion engine. In this example, the noted characteristic of the first component is an output of the motor and the noted characteristic of the second component is a speed of rotation of the internal combustion engine. However the multifunctional display can display characteristics of other components and systems other than hybrid propulsion systems.

Various other aspects and exemplary combinations for these examples are further described herein below.

BRIEF DESCRIPTION OF THE DRAWINGS

Examples of displays and display systems for marine vessel propulsion systems are described with reference to the following figures. The same numbers are used throughout the figures to reference like features and components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed. The different assemblies described herein may be used alone or in combination with other assemblies. For example, although the present examples of displays and display systems are incorporated with hybrid marine propulsion systems, the these examples can alternately be incorporated with non-hybrid marine propulsion systems, such as electric-only marine propulsion systems, or engine-only marine propulsion systems. Various equivalents, alternatives, and modifications are possible within the scope of the appended claims.

Figure 1:
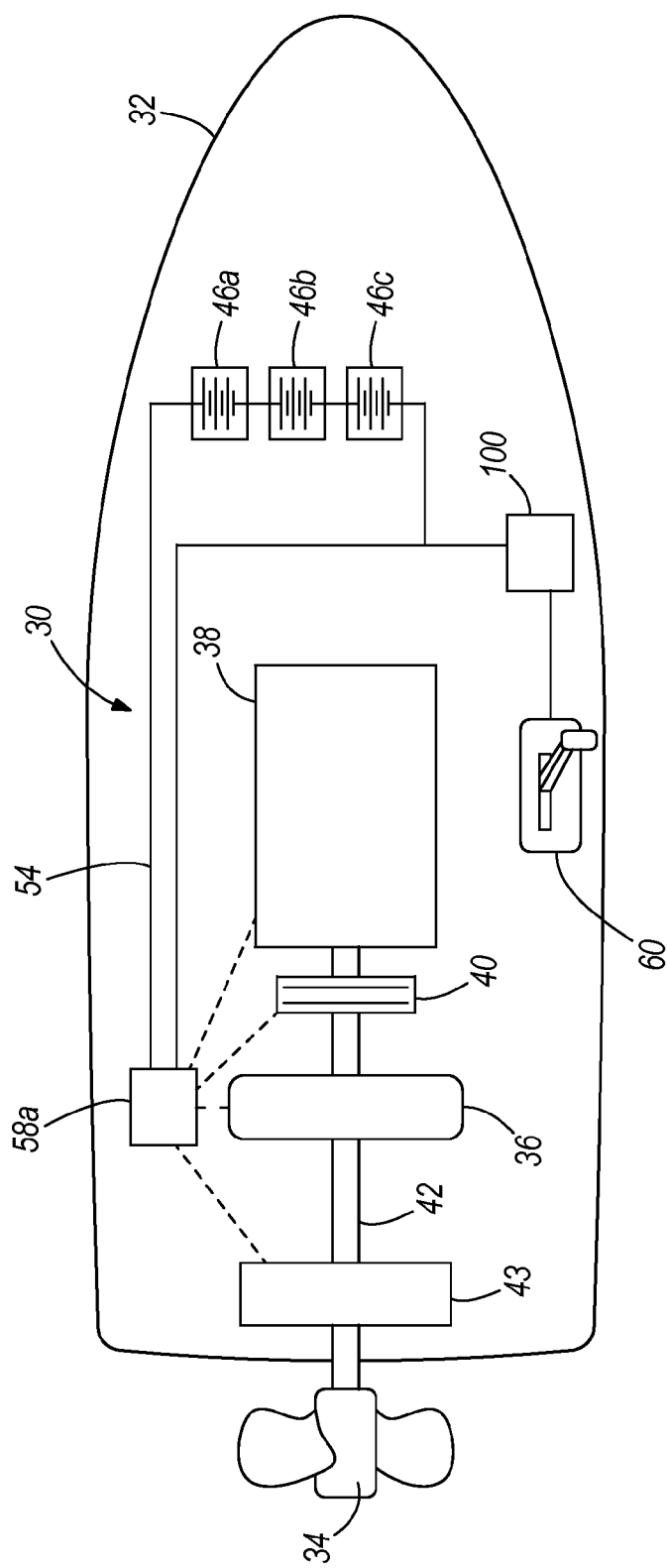
FIG. 1 is a schematic depiction of a marine vessel having a hybrid marine propulsion system.

FIG. 1 depicts a hybrid marine propulsion system 30 for a marine vessel 32. The propulsion system 30 includes among other things one or more propulsors 34 (collectively referred to herein as "propulsor"), which can include any type of device for propelling the marine vessel 32 including but not limited to one or more propellers (as shown in FIG. 1), impellors, stern drives, pod drives, and/or the like. The propulsor 34 is selectively driven by one or more electric motors 36 (collectively referred to herein as "motor"), one or more internal combustion engines 38 (collectively referred to herein as "engine"), and a combination of the motor 36 and engine 38. In the example shown, the propulsion system 30 also includes one or more clutches 40 (collectively referred to herein as "clutch") for selectively connecting and disconnecting engine 38 from a driveshaft 42 that extends from the engine 38 to a transmission 43 for driving the propulsor 34. The engine 38 can include a gas engine and/or a diesel engine and/or any other type of engine for providing power to the propulsor 34. The clutch 40 can include any type of clutch for connecting and disconnecting the engine 38 and driveshaft 42, such as for example a friction clutch, or a dog clutch.

The motor 36 is located between the clutch 40 and transmission 43 and is configured to drive driveshaft 42 at the same time or separately from the engine 38. In the example shown, the driveshaft 42 extends through and forms a part of the motor 36; however, arrangements where the motor 36 and driveshaft 42 are separate components are also contemplated and should be considered part of this disclosure. Together, the engine 38, clutch 40, motor 36 and transmission 43 provide forward, neutral, and reverse operations of propulsor 34 in a "parallel" drive arrangement; however it should be recognized that the examples shown and described are not limiting and that the concepts discussed and claimed herein are applicable to other types of parallel, non-parallel, and/or series hybrid marine propulsion configurations.

The propulsion system 30 further includes a plurality of rechargeable storage batteries 46a, 46b, 46c, which are connected in electrical communication with the motor 36 and discharge current to power the motor 36. In FIG. 1, three batteries 46a, 46b, 46c are shown connected in series with each other and to propulsion system 30; however the number of batteries 46 and the configuration thereof can vary from that shown. The motor 36 is operable as a generator to recharge batteries 46a, 46b, 46c. In this arrangement, the motor 36 is connectable in torque transmitting relation with, and driven by, the engine 38, which in turn provides a supply of current for recharging batteries 46a, 46b, 46c.

Figure 2:
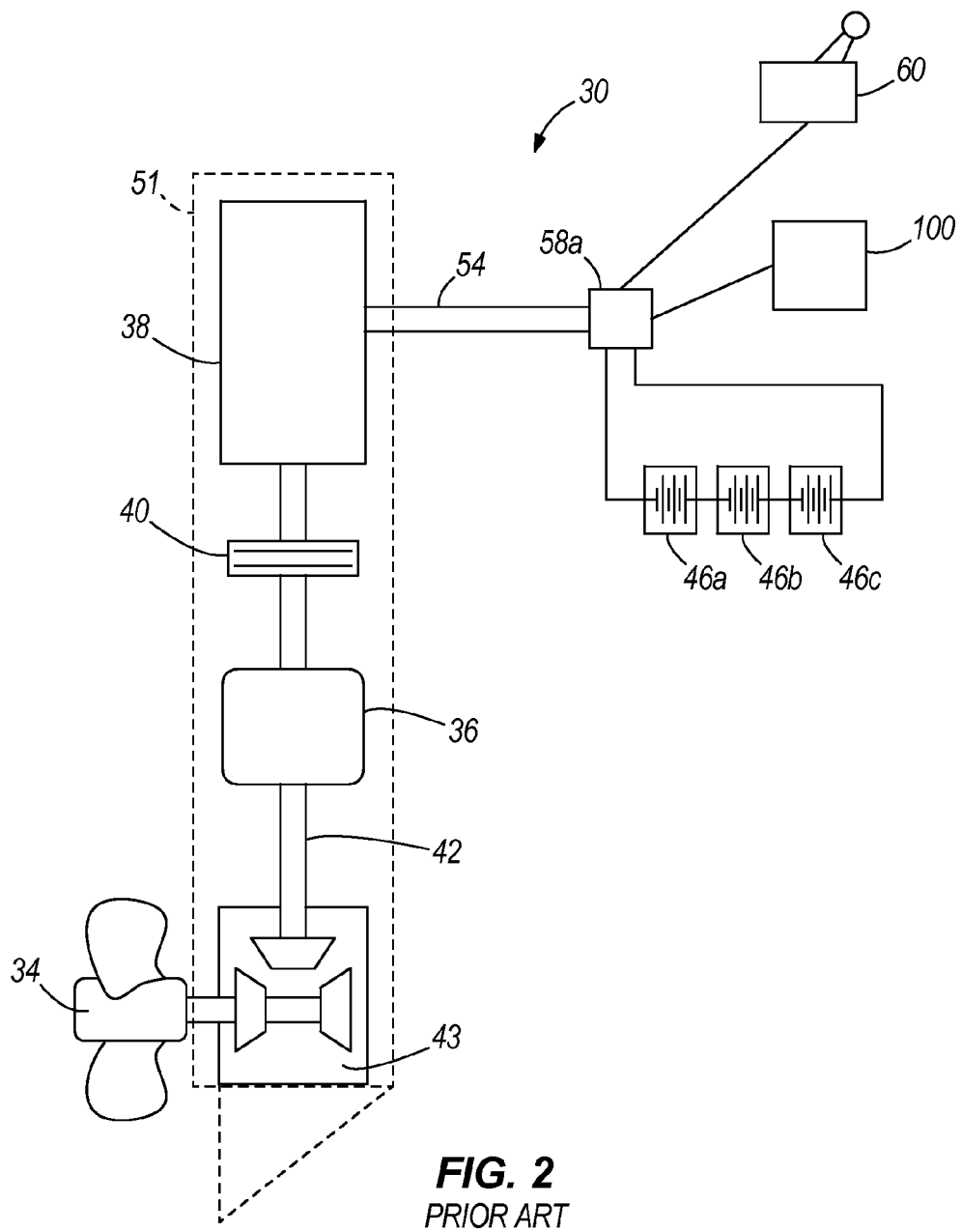
FIG. 2 is a schematic depiction of a marine vessel having a hybrid marine propulsion system configured as an outboard motor.

FIG. 1 depicts an inboard/outboard arrangement; however the concepts disclosed in this application are applicable to any type of propulsion system, such as for example an outboard motor arrangement. FIG. 2 depicts an outboard motor 51 according to such an arrangement, having reference numbers corresponding to the structures described with reference to FIG. 1.

Figure 3:
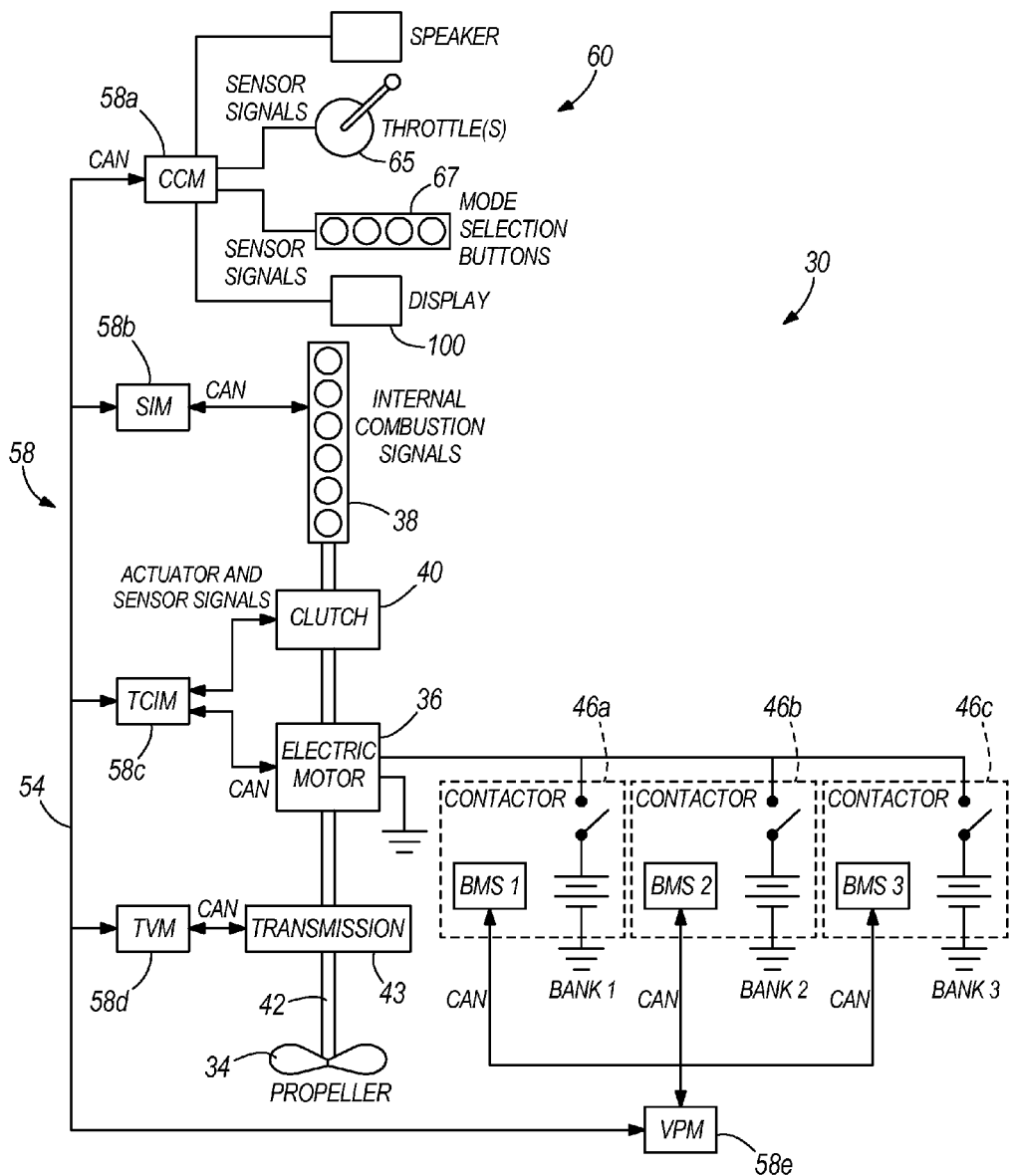
FIG. 3 is a schematic depiction of an exemplary hybrid marine propulsion system.
Figure 4:
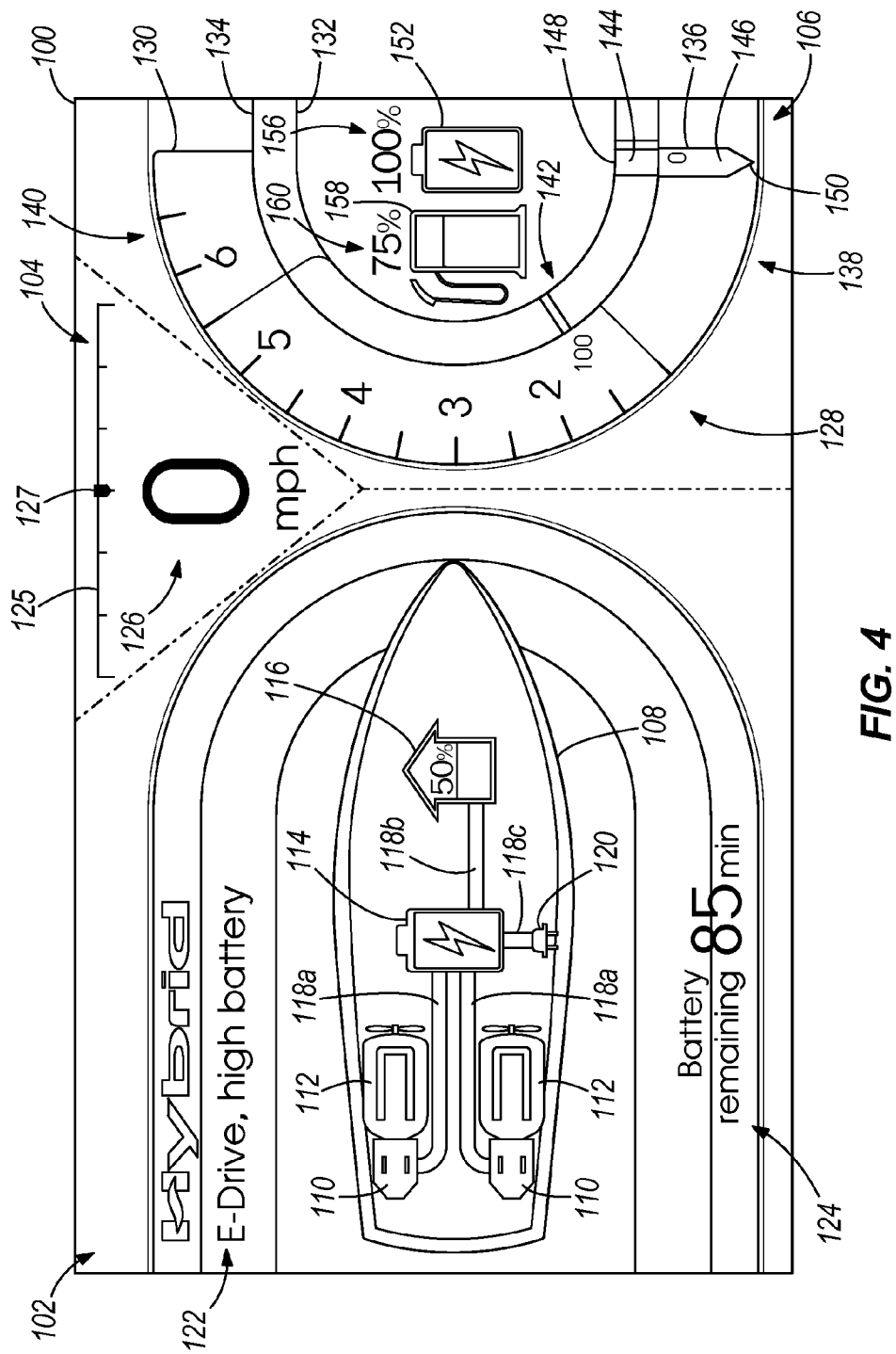
FIG. 4 is a multifunctional display for a marine vessel having a hybrid marine propulsion system.
Figure 5:
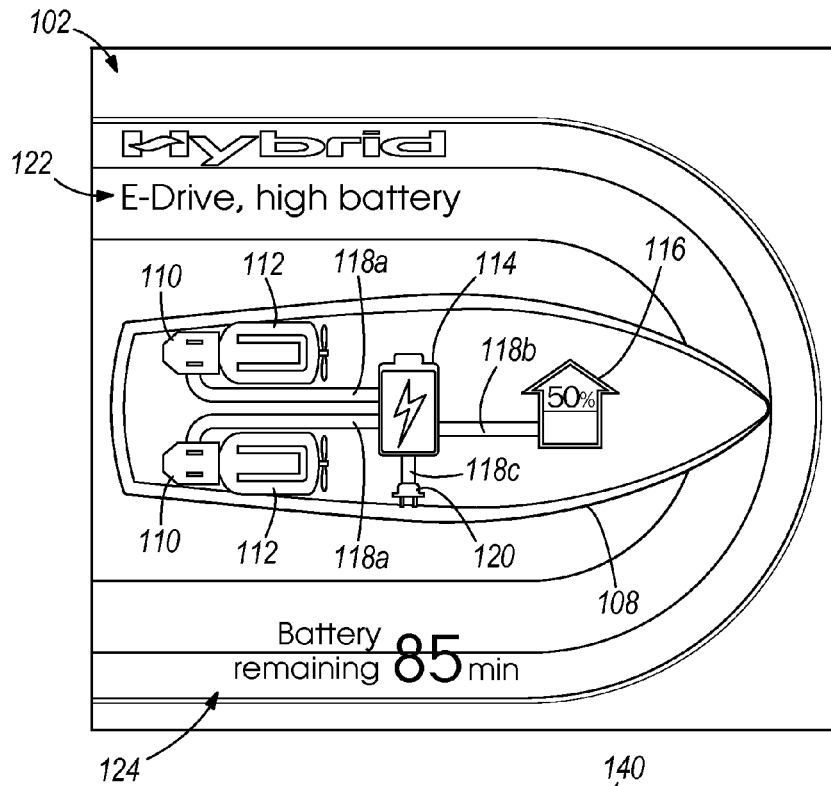
FIG. 5 is a first section of the multifunctional display having a marine vessel icon.
Figure 6:
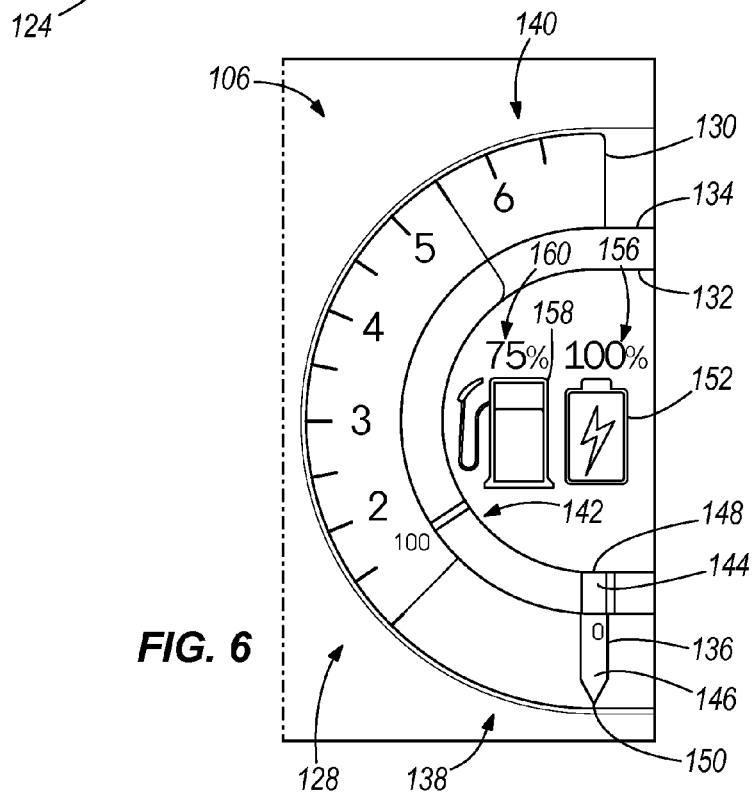
FIG. 6 is a second section of the multifunctional display having a sequential indicator.

Referring to FIG. 3, the propulsion system 30 also includes a control circuit 58 connected to a controller area network 54 (CAN) for operating the propulsion system 30 in a plurality of operational modes, which will be discussed herein below. The control circuit 58 is shown schematically and includes a plurality of controller sections 58a-58e, each section having a memory and processor for sending and receiving electronic control signals, for communicating with other controllers in the controller area network 54 and for controlling operations of certain components in the propulsion system 30 such as the engine 38, clutch 40 and motor 36. The configuration of the controller area network 54, control circuit 58, and sections 58a-58e can vary significantly from that shown and described. For example, the control circuit 58 does not need to include separately located sections and can instead comprise a single control circuit located at one location. Conversely, the control circuit 58 can include more sections than those shown and sections located at different locations than those shown.

In the example shown, the control circuit 58 includes a command control section 58a (CCM) that is configured to receive user inputs via the controller area network 54 from a user input device 60. The user input device 60 is shown in FIGS. 1 and 2 as a conventional combination throttle/shift lever 65 and in FIG. 3 including a plurality of mode selection buttons 67; however, the user input device 60 is not limited to these configurations and can additionally or alternately comprise other devices for inputting commands to the propulsion system 30, such as fewer or more input keys than that shown, or joy sticks, touch screens, and/or the like. Actuation of the user input device 60 is sensed by sensors (not shown) and communicated to a command control section 58a via the controller area network 54.

The command control section 58a is programmed to convert the user inputs into electronic commands and then send the commands to other controller sections in the propulsion system 30. These other controller sections include a transmission/engine controller (SIM) 58b that controls engine/transmission/shifting and reads signals regarding transmission state and output speed; a thermal, clutch motor interface module (TCIM) 58c that controls the cooling system, clutch 40, and provides communication interface between the controller area network 54 and a controller section (not shown) for the motor 36; and a drive control module (TVM) 58d that receives commands from the command control section 58a and controls for example a pod drive to a particular steering angle. Again, the controller area network 54 shown in FIG. 3 is exemplary and could be significantly changed and still fall within the scope of the present disclosure and achieve the system functional activities set forth herein.

During operation of the marine vessel 32, the control circuit 58 is programmed to control the various components of the propulsion system 30 under different operational modes including but not limited to (1) an electric drive operational mode, (2) a transitional operational mode, (3) an engine operational mode, (4) an electric boost operational mode, and (5) a shore power operational mode. In the electric drive operational mode, the motor 36 is connected to the propulsor 34 and all or substantially all of the driving force to the propulsor 34 is provided by the motor 36. In the transitional operational mode, both the motor 36 and the engine 38 are connected to the propulsor and the driving force to the propulsor is provided by a combination of the motor 36 and the engine 38. When the propulsion system 30 is transitioning from the electric drive operational mode to the engine operational mode, the amount of driving force provided by the engine 38 progressively increases as the amount of driving force provided by the motor 36 progressively decreases. When the propulsion system 30 is transitioning from the engine operational mode to the electric drive operational mode, the amount of driving force provided by the motor 36 progressively increases as the amount of the driving force provided by the engine 38 progressively decreases. In the engine operational mode, the engine 38 is connected to the propulsor 34 and all or substantially all of the driving force to the propulsor 34 is provided by the engine 38. During the engine operational mode, the battery 46 can be charged by the combination of the engine 38 and motor 36. During the electric boost operational mode, the engine 38 is providing driving force to the propulsor 34 as the motor 36 is also employed to apply a combination of output from the engine 38 and the motor 36 to the driveshaft 42 and thereby the motor 36 provides a "boost" of power. During the shore power operational mode, shore power is provided to charge the battery 46. In addition or alternately, the engine 38 and motor 36 can function together during shore power operational mode to charge the battery 46.

As is conventional, the mode of operation that is utilized at any given time can depend upon the specific operating conditions of the marine vessel 32 or can depend upon inputs provided by the user at, for example, the input device 60. The propulsion system 30 disclosed herein is thus configured to provide switching between and/or modification of the various modes of operation while the engine 38 is running and/or while the motor 36 is running and with the propulsor 34 in neutral or in gear. For example, it is often desirable to switch into electric drive operational mode when operating the marine vessel 32 at low speeds to thereby provide quieter vessel operation and more fuel efficient vessel operation. It is often desirable to switch into engine operational mode, and more specifically to charge the battery 46, when the power of the battery 46 is low, to thereby draw recharging current from the motor 36.

The propulsion system 30 also includes a display 100 for conveying operational characteristics of the propulsion system 30 to the user. Through research and experimentation, the present inventor has realized that there is a need in the art for improved displays and display systems that more effectively convey information regarding changes in the present operational mode of propulsion systems and information regarding characteristics of components of the propulsion systems in a real-time display. Examples of such displays and display systems are disclosed herein and described with reference to FIGS. 4-19.

FIGS. 4-19 depicts an example of a multifunctional display 100 for the marine vessel 32 and for the propulsion system 30 associated with the marine vessel 32. The display 100 has three sections, including a first section 102, a second section 104 and a third section 106. Each of the sections 102, 104, 106 displays operational information regarding the marine vessel 32. In this example, the first section 102 has a marine vessel icon 108 that is shaped like a marine vessel. The marine vessel icon 108 has several other icons depicting changes in characteristics of components of the propulsion system 30 during one or more of the noted operational modes of propulsion system 30. A first icon is a motor icon 110 which represents and depicts changes in characteristics of the motor 36. Two motor icons 110 are shown, each representing a single motor 36 in the propulsion system 30, however one or more than two motor icons 110 could instead be employed. A second icon is an engine icon 112 which depicts and represents changes in characteristics of the engine 38. Two engine icons 112 are shown, each representing a single engine 38 in the propulsion system 30, however one or more than two engine icons 112 could instead be employed. A third icon is a battery icon 114 which represents and depicts changes in characteristics of the battery 46. Again, the number of battery icons 114 can vary depending upon the number of batteries (e.g. 46a, 46b, etc.) in the propulsion system 30. A house load icon 116 represents an amount of power being drawn from the battery 46 by various electrical devices on the marine vessel 32 during operation thereof. The number of house load icons 116 can also vary and can for example be employed to represent specific items on the marine vessel 32 that constitute a house load. A plurality of conduits 118a, 118b, 118c extend between the respective icons 110, 114 and 116 and display a transfer of energy between the respective components of the propulsion system, namely the motor 36, battery 46 and noted house load. A plug icon 120 is located at the end of conduit 118c to represent any means for connecting to a source of shore power for recharging the battery 46, as will be described further herein below.

During operation of the propulsion system 30, the appearance of the various icons on the display 100 can change in appearance (e.g. location and/or color) to indicate to the user a present operational mode of the propulsion system 30 and/or a present characteristic of a component of the marine vessel 32. For example, the color of some of the icons and conduits can change progressively or all at once to indicate whether the engine 38 is providing power to the propulsor 34, whether the motor 36 is providing power to the propulsor 34, or whether some other combination of the engine 38 and motor 36 are providing power to the propulsor 34. Also, the color of some of the icons and some of the conduits can change progressively or all at once to indicate whether the motor 36 is drawing power from the battery 46, whether a house load is being drawn from the battery 46 and whether the engine 38 is providing power to recharge the battery 46. For example, the engine icon 112 can be illuminated in a first color (e.g. orange) when the engine 38 is providing power to the propulsor 34. Similarly, the motor icon 110 can be illuminated in a second, different color (e.g. blue) when the motor 36 is providing power to the propulsor 34. Similarly, the engine icon 112 and the battery icon 114 can be illuminated the noted first and second colors, respectively, when both the engine 38 and motor 36 are providing the noted power to the propulsor 34. Similarly, the battery icon 114 can be illuminated the second color when the motor 36 is drawing power from the battery 46. Similarly, the house load icon 116 can be illuminated the second color when a house load is being drawn from the battery 46. The icons 114, 116 can be colored progressively to indicate, for example an amount of available charge in the battery 46 or amount of available house load. The conduits 118 can also be illuminated the same color as the icon that is actively colored, such as for example the second color when the battery icon 114 and motor icon 110 are colored, etc. Flow of shore power to the battery 46 can be indicated by coloring the plug icon 120 and the conduit 118c a certain color, which can be the same as or different from the noted second color. As explained further herein below, the conduits 118 can also indicate flow in the form of arrows, wave patterns, and/or the like to show the direction of flow, for example to the battery 46 from the engine 38, from the battery 46 to the motor 36, from the battery 46 to the house load, from shore power to the battery 46 and/or the like. The conduit 118a, 118c and the battery icon can also be colored a third color (e.g. green) during charging.

The first section 102 of the display 100 also indicates in plain text the current operational mode of the propulsion system 30 at location 122. In addition, a wake icon 121 (see e.g. FIGS. 8-18, 20, and 21) indicates the noted change in operational mode of the propulsion system 30. The wake icon 121 is located aft of the marine vessel icon 108 and can change in appearance (e.g. color and/or size) upon a change in operational mode of the propulsion system 30. Changes in color of the wake icon 121 can match the noted changes in color of the motor icon 110, engine icon 112, battery icon 114, and conduits 118. For example, when the engine 38 is powering the propulsor 34, the wake icon 121 can be changed to the first color to match that of the engine icon 112. When the motor 36 is powering the propulsor 34, the wake icon 121 can be changed to the second color to match that of the motor icon 110. When both the engine 38 and motor 36 are powering the propulsor 34, the wake icon 121 can be changed to display both the first and second colors at the same time. In addition, the text at location 122 can change as the operational mode of the propulsion system 30 changes, as will be described further herein below. The first section 102 of the display 100 can also indicate the time of useable remaining life of battery 46 at location 124. This indication can be provided for example in terms of minutes. Location 124 also optionally displays the amount of time left to recharge the battery 46, see FIG. 19 and the further description herein below. In other examples, location 124 displays the amount of time of remaining available boost during the noted electric boost operational mode, see FIG. 21 and further description herein below.

The marine vessel icon 108 can also change position on the display 100 when the propulsion system 30 changes from one operational mode to the next. For example, when the propulsion system 30 is not moving, the marine vessel icon 108 can be depicted at a first location on the display 100 (see FIG. 7). When the propulsion system 30 is operating in motor operational mode, the marine vessel icon 108 can be depicted at a second location on the display, located forwardly of the first location (see FIGS. 8-10). When the propulsion system is operating in engine operational mode, the marine vessel icon 108 can be depicted at a third location on the display, located forwardly of the second location (see FIGS. 12-15 and 20). When the propulsion system 30 is operating in an electric motor boost operational mode, the marine vessel icon 108 can be depicted at a fourth location on the display, located forwardly of the third location (see FIGS. 16-17 and 21). When the propulsion system 30 is operating in the shore power operational mode, the marine vessel icon 108 can be depicted at a location on the display 100 that is aft of the second, third and fourth positions (see FIGS. 19 and 22). The position of the marine vessel icon 108 on the display can thus be tied to the present operational mode and optionally the present speed of the propulsion system 30, thus effectively communicating such mode and optionally speed to the user through movement of the marine vessel icon 108 on the display 100. The position of the marine vessel icon 108 on the display 100 can be tied solely to the present operational mode of the propulsion system 30, or optionally to a combination of the present operational mode of the propulsion system 30 and various threshold speeds.

The second section 104 is located between the first and third sections 102, 106 and provides a speedometer 126 for indicating the present speed of the marine vessel 32. An indicator line 125 and marker 127 indicates the present steering angle of the propulsor 34. The marker 127 moves left and right along the indicator line 125 to indicate corresponding steering angle changes to the user.

The third section 106 includes a sequential indicator 128, which in the example shown includes a linear pathway in the form of a curvilinear dial 130. The sequential indicator does not need to be curvilinear and can include any other type of linear pathway. The dial 130 has inner and outer arcuate sides 132, 134 and sequential numerical indicia spaced apart along the dial 130. The sequential indicator 128 has a first portion 138, second portion 140 and a transition portion 142 located between the first portion 138 and second portion 140. The first portion 138 depicts changes in a characteristic of a first component of the propulsion system 30 during a first operational mode of the propulsion system 30, the second portion 140 depicts changes in a characteristic of a second component of the propulsion system 30 during a second operational mode of the propulsion system 30, and the transition portion 142 depicts a change in operation of the propulsion system 30 between the first operational mode and the second operational mode. This will be explained further herein below.

During operation of the propulsion system 30, a directional marker 136 moves along the first portion 138 of the sequential indicator 128 to depict changes in the noted characteristic of the first component of the propulsion system 30. The directional marker 136 also moves along the second portion 140 of the sequential indicator 128 to depict changes in the noted characteristic of the second component of the propulsion system 30. The directional marker 136 crosses over the transition portion 142 between the first and second portions 138, 140 to depict the change in operation of the propulsion system 30 between the noted first and second operational modes. The type and configuration of directional marker 136 can vary from that shown. In this example, the directional marker 136 is in the shape of a needle that has a first portion 144 that moves along the sequential indicator 128 to depict the noted changes in the characteristic of the first component and a second portion 146 that moves along the sequential indicator 128 to depict the noted changes in the characteristic of the second component. In this example, both the first and second portions 144, 146 of the directional marker 136 move along both of the first and second portions 138, 140 of the sequential indicator 128. The directional marker 136 has a first inner end 148 (see FIGS. 4 and 6) that is adjacent the inner arcuate side 132 of the dial 130 and a second outer end 150 (see FIGS. 4 and 6) that extends outwardly from the outer arcuate side 134 of the sequential indicator 128.

In the example shown, the third section 106 is configured to display characteristics of the propulsion system 30, which in this example is a hybrid marine propulsion system 30. The noted first component is the motor 36 and the noted second component is the engine 38. The noted characteristic of the first component is an output of the motor 36 and the noted characteristic of the second component is an output or speed of rotation of the engine 38.

In this example, the third section 106 also includes a charge level icon 152 displaying changes in a charge level of the battery 46 powering the motor 36. Changes in the charge level of the battery 46 can be displayed by progressive changes in color of the charge level icon 152, as will be described further herein below. In addition, an arrow (not shown) can be provided adjacent (for example beneath) the charge level icon 152 for indicating whether a charge level of the battery 46 is increasing or decreasing under a present operational mode. The arrow can be displayed in one direction (e.g. upwardly) indicating a progressively increasing charge level of the battery 46 and displayed in another direction (e.g. downwardly) indicating a progressively decreasing charge level in the battery 46. Further, numerical indicia at location 156 are provided adjacent the charge level icon 152 to display changes in charge level of the battery 46 in terms of a percentage. The third section 106 also has a fuel level icon 158 displaying changes in an amount of fuel in the engine 38. Changes in the amount of fuel in the engine 38 can be displayed by progressive changes in color of the fuel level icon 158. Further, numerical indicia at location 160 are provided adjacent the fuel level icon 158 to indicate changes in fuel level of the engine 38, in terms of a percentage.

FIGS. 7-19, 20, 21 and 22 depict some examples of progressive changes in the display 100 during operation of the propulsion system 30. It should be recognized that the order and progression of the display characteristics shown in the figures are merely exemplary and the display can provide characteristics in different orders or different progressions depending upon the particular propulsion system 30 in use and depending upon the conditions under which the marine vessel 32 is operated. For example, as described above, user inputs to the propulsion system 30 can change the way in which the noted operational modes are employed, thus changing the display 100 in a corresponding manner. FIGS. 7-22 are thus are not intended to be limiting.

Figure 7:
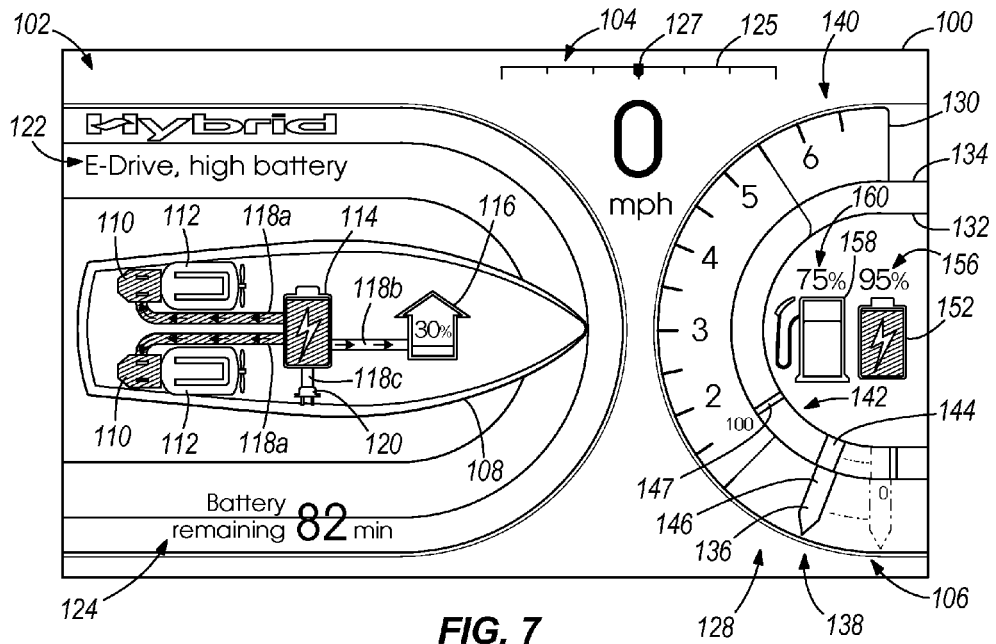
FIGS. 7-9 depict the multifunctional display when the propulsion system is operating in an electric drive operational mode.

FIG. 7 is a view of the display 100 upon initiation of electric drive operational mode for the propulsion system 30. The first section 102 of the display 100, at location 122, displays the text "E-Drive, high battery" to indicate to the user that the electric drive operational mode is under way and that a relatively large amount of battery life is available for consumption. The second section 104 of the display indicates a speed of the marine vessel 32 of zero miles per hour and a current steering angle. The third section 106 of the display 100 indicates that 95% of battery life is available for consumption, as indicated at location 156 and via colorization of charge level icon 152, which is filled with the noted second color (for example the color blue). The fuel level icon 158 depicts that 75% of fuel capacity is available for operation of the engine 38. The engine icon 112 is not shown in color because the engine 38 is not currently providing power to the propulsor 34. As the motor 36 is operated, the motor icons 110 are colored the second color. Similarly, as the motor 36 is operated, the battery icon 114 and conduits 118a are colored the second color to illustrate that charge from the battery 46 is being provided to the motor 36. Arrows, wave flow, or other similar moving indicators can be displayed in the conduits 118a to illustrate the noted flow of charge from the battery 46 to the motor 36. Simultaneously, charge from the battery 114 that is being drawn by the house load is shown the second color in house load icon 116. The percentage of house load available is also shown inside of the house load icon 116 in a numerical percentage value. In FIG. 7, the marine vessel icon 108 is on the display 100 in a first location.

Figure 8:
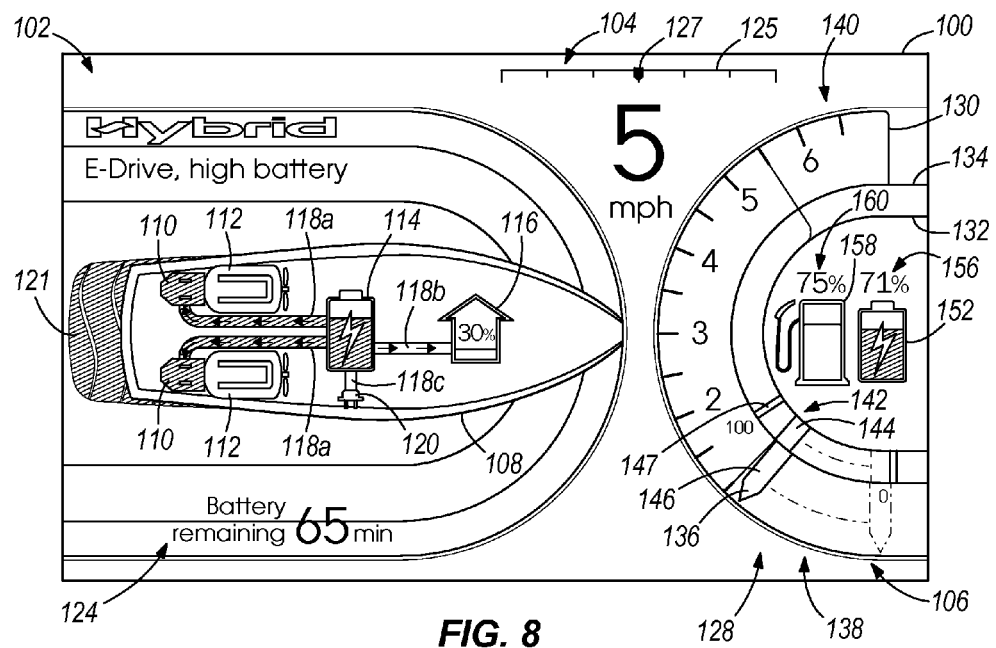

FIG. 8 shows continued operation of the propulsion system 30 in electric drive operational mode. As the electric drive operational mode continues and the speed of the marine vessel 32 increases, the marine vessel icon 108 moves forwardly on the display 100 (in this example from left to right) to a second location and a wake icon 121 is displayed aft of the marine vessel icon 108. The wake icon 121 is colored the second color, matching the color of the motor icon 110, conduit icons 118a, battery icon 114 and charge level icon 152. This indicates to the user that the marine vessel 32 is being powered by the motor 36. As the charge is drawn from the battery 46, the amount of color in the battery icon 114 progressively decreases. Similarly, the time of battery remaining at location 124 progressively decreases. Also, the amount of color in the charge level icon 152 progressively decreases and the percentage at location 156 progressively decreases. Also, as the output of the motor 36 progressively increases, the directional marker 136 moves from zero towards a threshold 147 (here "100") on the first portion 138 of the sequential indicator 128 to indicate to the user the amount of motor output presently being used by the propulsion system 30 and also the amount of motor output still available for use.

Figure 9:
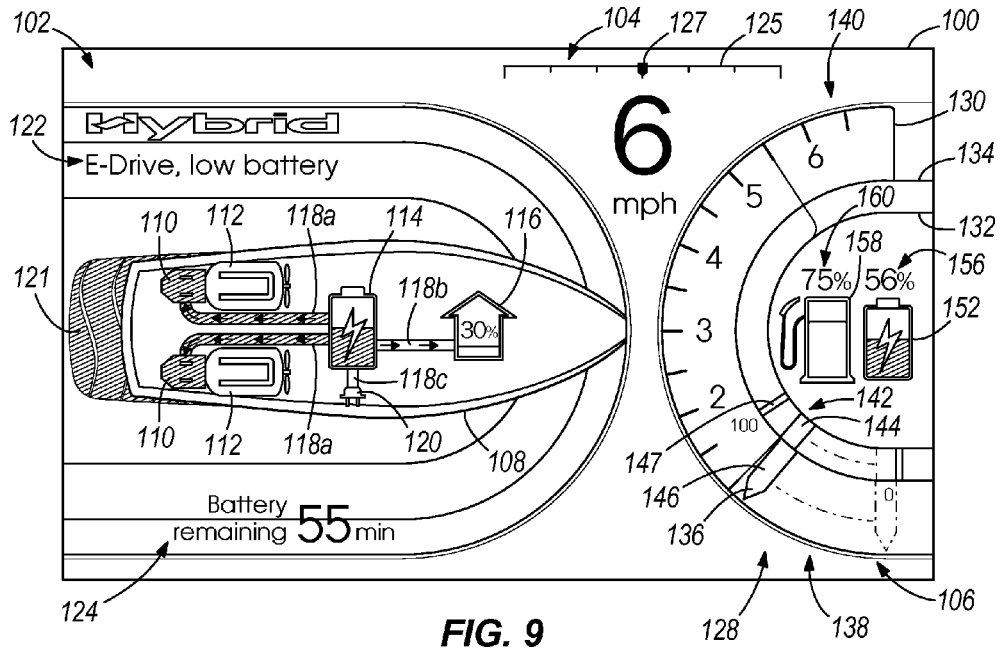

FIG. 9 depicts the display 100 during continued operation of the propulsion system 30 in electric drive operational mode. FIG. 9 differs from FIG. 8 in that the amount of charge available from the battery 46 has decreased below a predetermined threshold, thus causing the location 122 to display the text "low battery". As can be seen by comparing FIG. 9 to FIG. 8, the remaining charge of the battery 46, as represented by the battery icon 114 and the charge level icon 152 has decreased. This is shown by decreasing the amount of color in these icons. Also, the amount of time of available life of the battery 46 has decreased, as shown at location 124.

Figure 10:
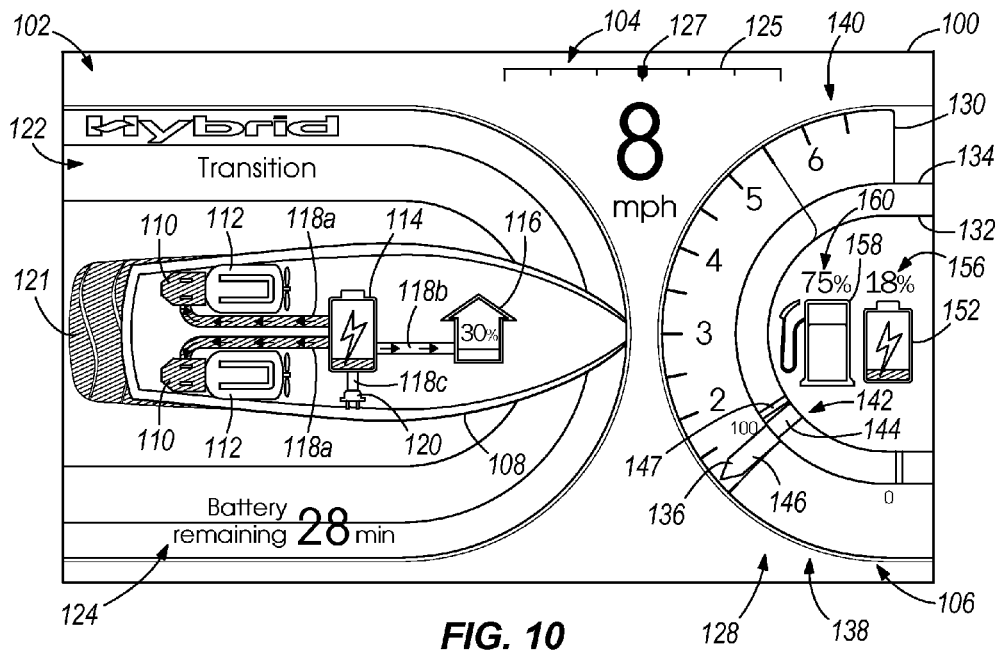
FIG. 10 depicts the multifunctional display when the propulsion system is operating in a transitional operational mode.
Figure 11:
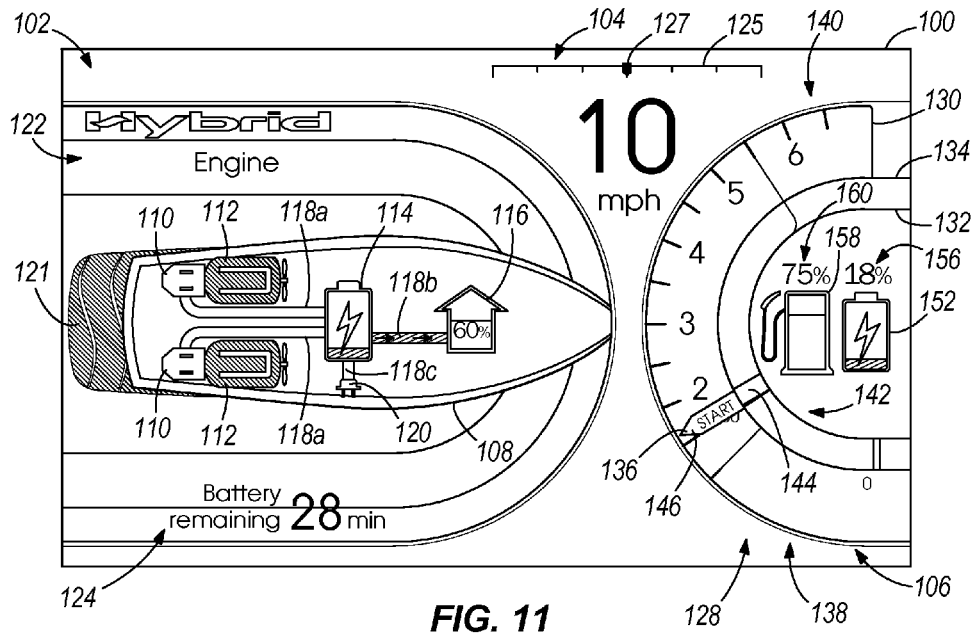
FIGS. 11-14 depict the multifunctional display when the propulsion system is operating in an engine operational mode.

FIG. 10 depicts the display 100 when the propulsion system 30 is in a transitional operational mode between the electric drive operational mode and the engine operational mode. The text "Transition" is depicted at location 122. As the charge of the battery 46 decreases below a certain level, the control circuit 58 transitions the propulsion system 30 into the engine operational mode, which will be described with reference to FIGS. 11-14 herein below. The directional marker 136 travels across the transition portion 142 of the sequential indicator 128 thus clearly identifying to the user when the propulsion system 30 is transitioning from electric drive operational mode and engine operational mode. As shown in FIG. 11, as the directional marker 136 crosses the threshold 147 at the transition portion 142, the text "START" can be displayed on the directional marker 136 to indicate to the user that the engine 38 has started.

FIG. 11 depicts the display 100 during initial operation of the propulsion system 30 in engine operational mode. The word "Engine" is depicted at location 122. The engine icons 112 and the wake icon 121 are colored the noted first color (for example orange) that is different than the second color to indicate to the user that the engine 38 is providing power to the propulsor 34. The conduits 118a and the motor icons 110 are not colored because the motor 36 is not providing power to the propulsor 34. Conduit 118b is colored the second color to indicate to the user that a house load is still being drawn from the battery 114. Also, the directional marker 136 crosses through the transition portion 142 into the second portion 140 which in the example shown is a tachometer showing engine speed. As the directional marker 136 moves along the second portion 140 of the sequential indicator 128, engine speed is understood to have increased by the denomination provided by the numerical indicia.

Figure 12:
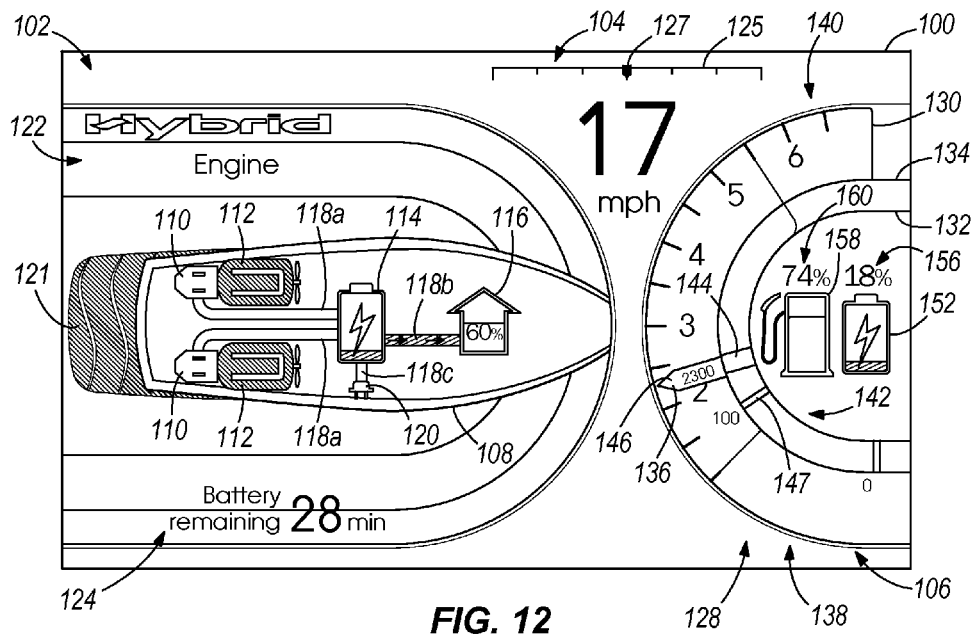

FIG. 12 shows the display 100 during continued operation of the propulsion system 30 in engine operational mode. The marine vessel icon 108 has moved into a third location on the display 100 that is located forwardly of the first location shown in FIG. 8 to further indicate to the user that the propulsion system 30 is operating in engine operational mode. As the user requests increased speed of the marine vessel 32, the engine 38 powers the propulsor 34 and the second section 104 shows the increased speed on the speedometer. The directional marker 136 progressively moves along the second portion 140 of the sequential indicator 128. The directional marker 136 also displays a numerical indication of the RPM of the engine 38 (in this view the numerical indication is 2300 RPM). As can be seen by comparing FIG. 11 to FIG. 12, the fuel level icon 158 shows a decreasing amount of fuel available for use by the engine 38. This is shown by percentage at location 160 and by progressively decreasing the amount of the first color in the fuel level icon 158. The color of the fuel level icon 158 thus matches the color of the engine icons 112 and wake icon 121.

Figure 13:
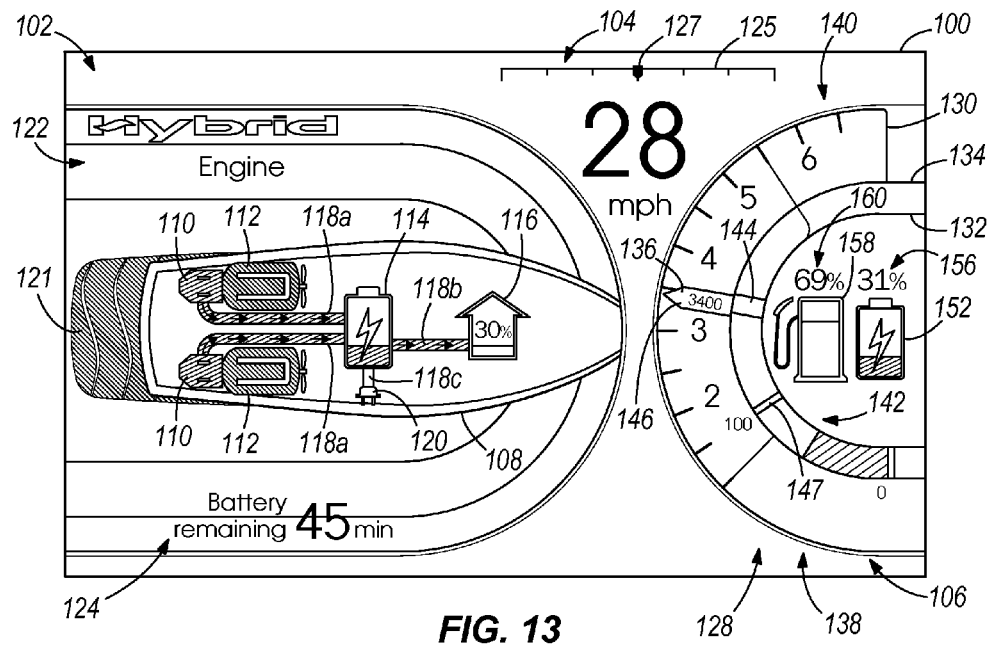

FIG. 13 shows the display 100 during continued operation of the propulsion system 30 in engine operational mode, during which the engine 38 and motor 36 operate to recharge battery 26. Motor icons 110 and conduits 118a are now colored the third color (e.g. green) and respective arrows or flow patterns indicate flow of charge from the motor icons 110 to the battery icon 114. The first portion 138 of the sequential indicator is progressively colored the third color, indicating charging of the battery 26 via the motor 36. The battery icon 114, charge level icon 152 and percentage indicator at location 156 show a progressively increasing amount of charge available from the battery 46. The amount of battery remaining in terms of time progressively increases at location 124.

Figure 14:
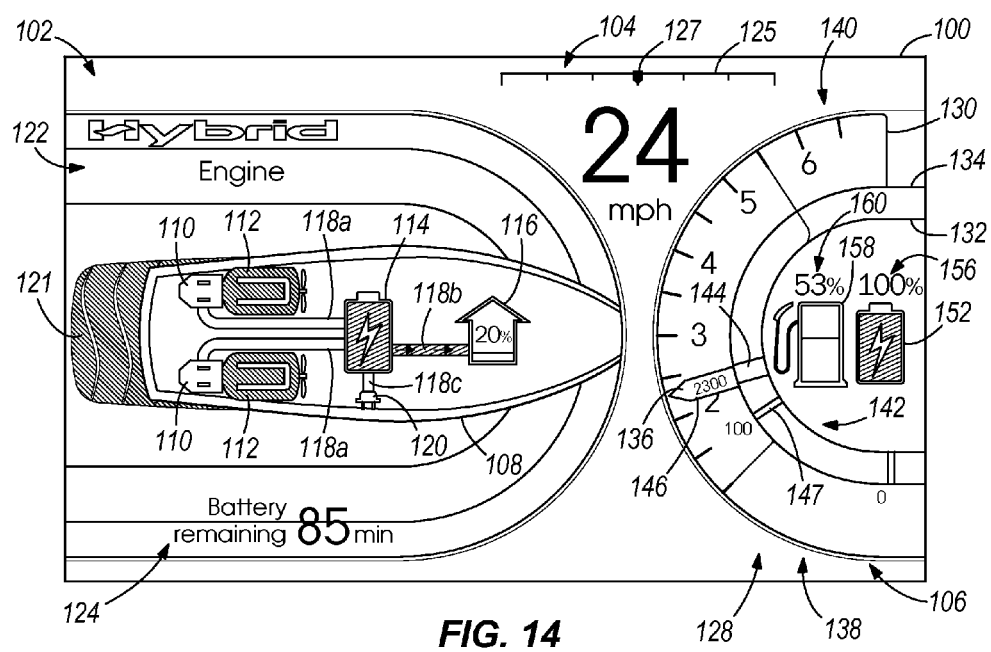

FIG. 14 shows the display 100 during continued operation of the propulsion system 30 in the engine operational mode, at a point where the battery 46 has been 100% charged. The battery icon 114 and charge level icon 152 are no longer colored and the percentage indicator at 156 shows 100%. The total amount of battery remaining is 85 minutes, as shown at location 124.

Figure 15:
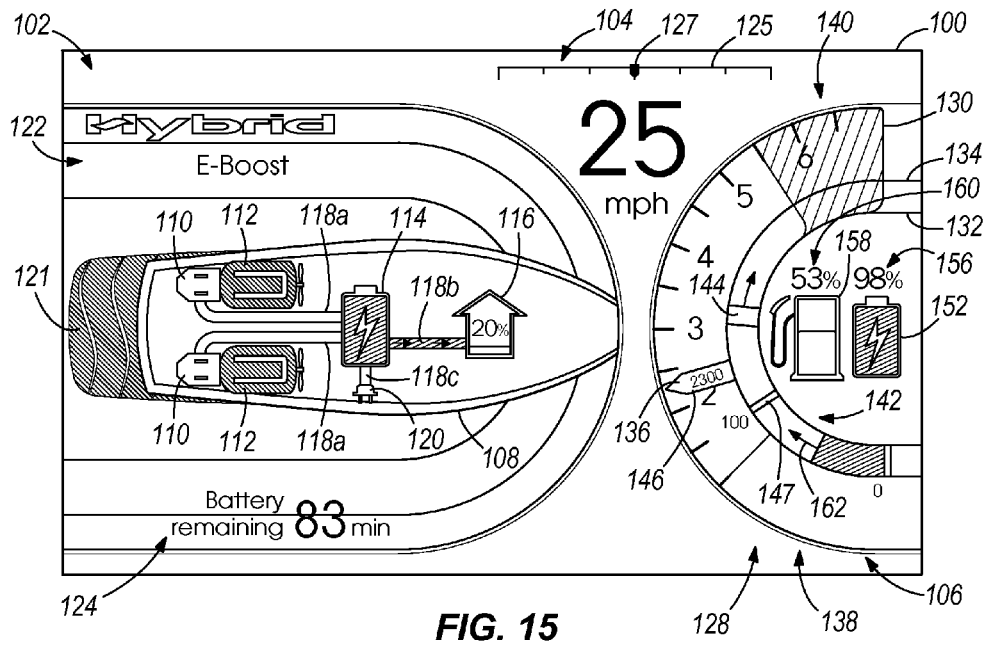
FIGS. 15-18 depict the multifunctional display when the propulsion system is operating in an electric boost operational mode.
Figure 16:
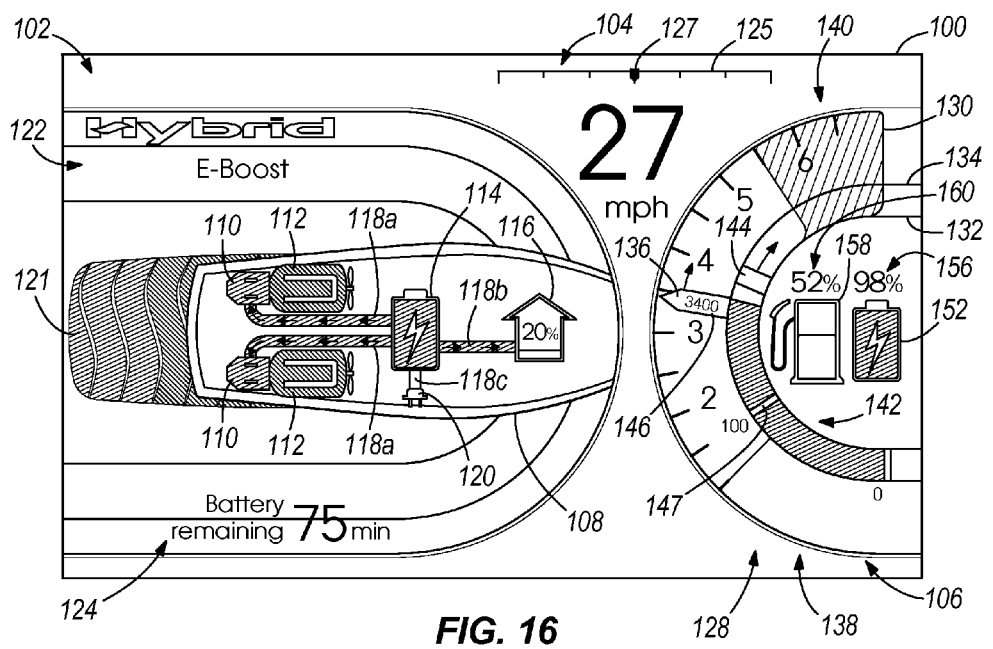
Figure 17:
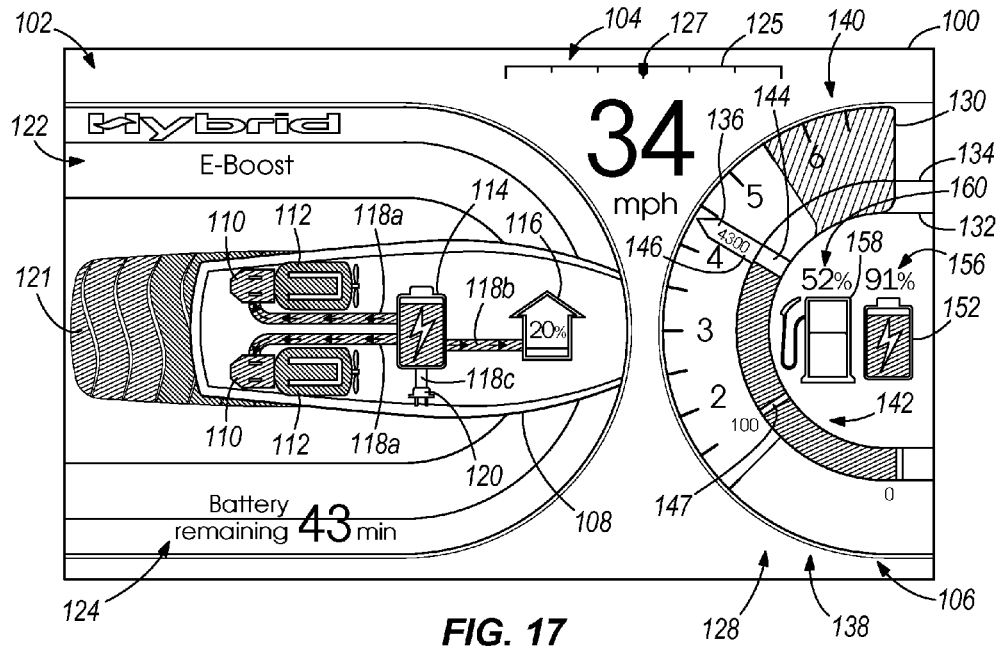

FIGS. 15-17 show the display 100 during operation of the propulsion system 30 in electric boost operational mode. FIG. 15 shows the display 100 during initial operation of the propulsion system 30 under the electric boost operational mode. The text "E-Boost" is depicted at location 122. The first and second portions 138, 140 of the sequential indicator 128 is progressively colored between the inner and outer arcuate portions 132, 134 of the dial 130 in the second color as shown at arrow 162 to indicate to the user that the motor 36 is providing a boost to the propulsor 34. The first and second portions 144, 146 of the directional marker 136 split to indicate with the first portion 144 that the motor 36 has begun providing a boost to the propulsor 34 and with the second portion 146, that the engine 38 is still powering the propulsor 34.

FIG. 16 illustrates the display 100 during continued operation of the propulsion system 30 in the electric boost operational mode. The marine vessel icon 108 is moved in a fourth position on the display 100, located forward of the location shown in FIGS. 12-15, to indicate to the user that a combination of the motor 36 and engine 38 are providing power to the propulsor 34 to achieve increased speed of the marine vessel 32. The motor icons 110, conduits 118*a* and battery icon 114 are colored the second color and a flow pattern, for example arrows, is shown illustrating flow of power from the battery 46 to the motor 36. The engine icons 112 are colored the noted first color. The wake icon 121 is colored a combination of the first and second colors to indicate to the user that both the motor 36 and engine 38 are providing power to the propulsor 34. The house load icon 116 and conduit 118*b* are colored the second color and a flow pattern, for example arrows, shows flow of power from the battery 46 to the house load. The second portion 146 of the directional marker 136 and the color within the inner and outer arcuate sides 132, 134 of the dial 130 continue to move together along the first and second portions 138, 140 of the sequential indicator 128 to show output of the motor 36. The life of battery 46 remaining is progressively decreasing as shown at location 124.

FIG. 17 shows the display 100 during continued operation of the propulsion system 30 in the electric boost operational mode, wherein the first and second portions 144, 146 are again aligned on the indicator 128 to indicate that both the motor 36 and engine 38 are powering the propulsor 34.

Figure 18:
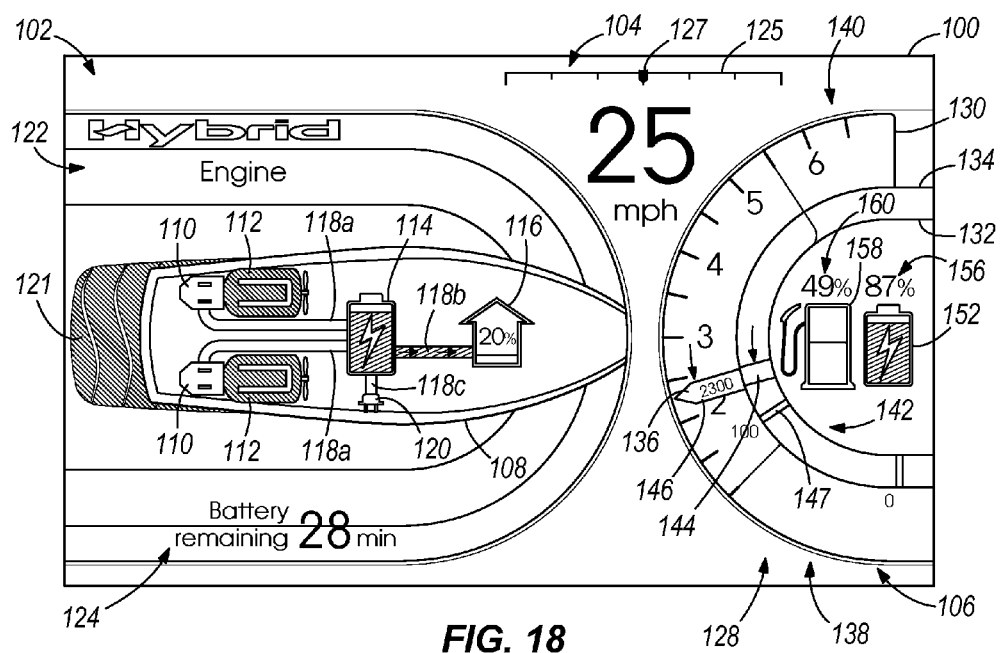

FIG. 18 depicts the display 100 during further operation of the propulsion system in the engine mode after electric boost operational mode ceases. The motor icon 110 and conduits 118*a* are no longer colored to indicate to the user that the motor 36 is no longer providing output to the propulsor 34. The wake icon 121 is now only colored the noted first color to indicate that the engine 38 is the sole source of power to the propulsor 34. Similarly, the noted second color does not fill the inner and outer arcuate sides 132, 134 of the dial 130 any longer, indicating that the motor 36 is not providing boost power.

Figure 19:
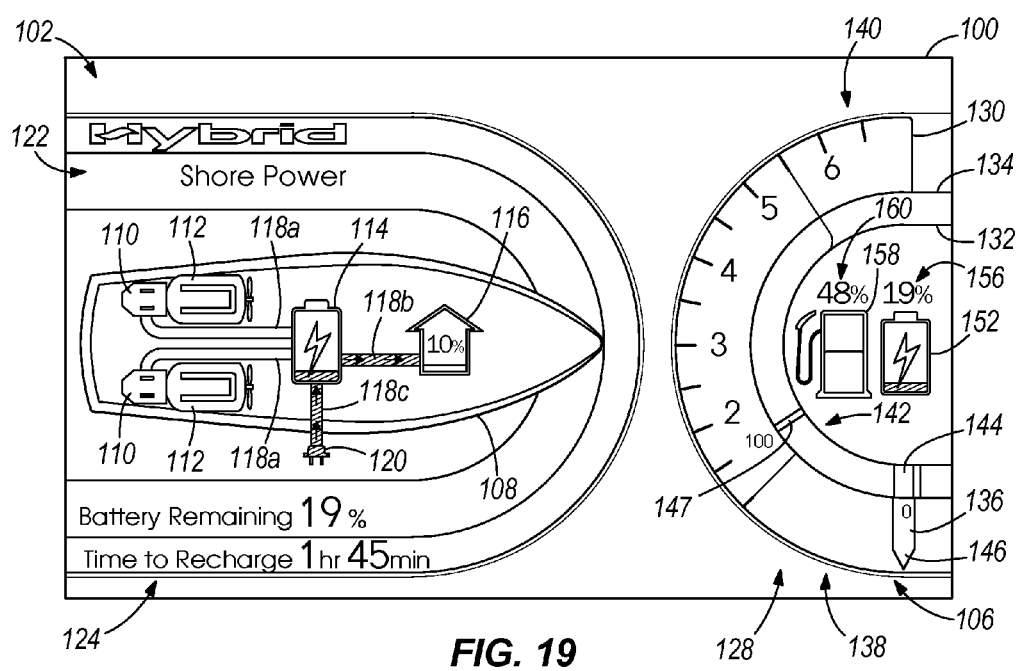
FIG. 19 depicts the multifunctional display when the propulsion system is operating in a shore power operational mode.

FIG. 19 depicts the display 100 during operation of the propulsion system 30 under the shore power operational mode. The text "Shore Power" is depicted at location 122. The position of the marine vessel icon 108 on the display 100 has been returned to a location that is aft of the noted second, third and fourth positions during engine operational mode and electric boost operational mode. The conduit 118*c* is extended to indicate attachment of means for connection to shore power. The conduit 118*c* is colored the third color to indicate flow of charge from shore power to the battery 46. The conduit 118*b* is colored the second color to show flow of charge from the battery 46 to the house load. The time to fully recharge the battery 46 and the amount of battery remaining in percentage is provided at location 124. Because the marine vessel 32 is stationary, the directional marker 136 has returned to the lower end of the sequential indicator 128 to show zero output from the motor 36 and engine 38.

Figure 20:
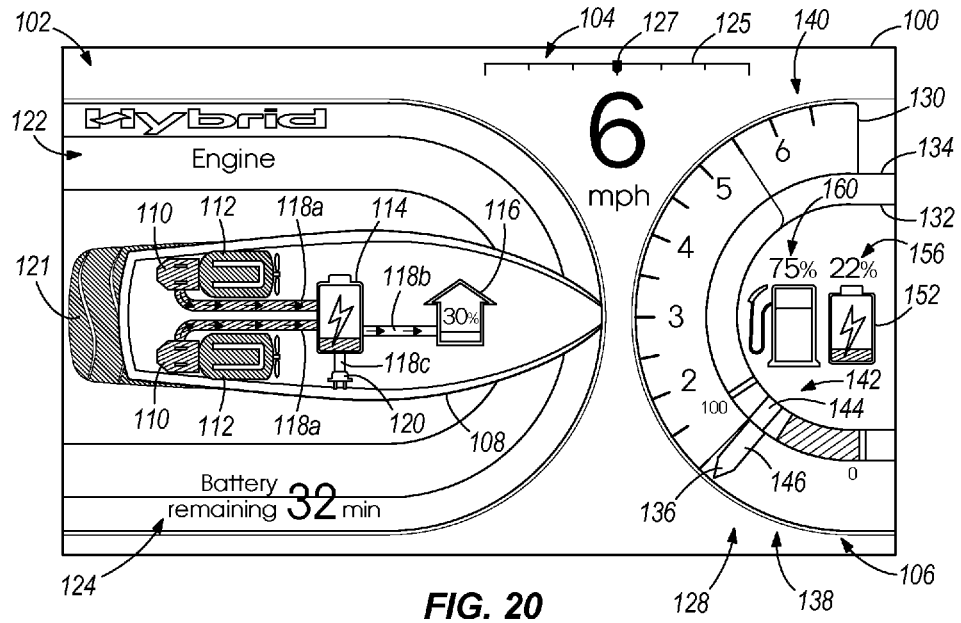
FIG. 20 depicts another example of the multifunctional display when the propulsion system is operating in an engine operational mode.
Figure 21:
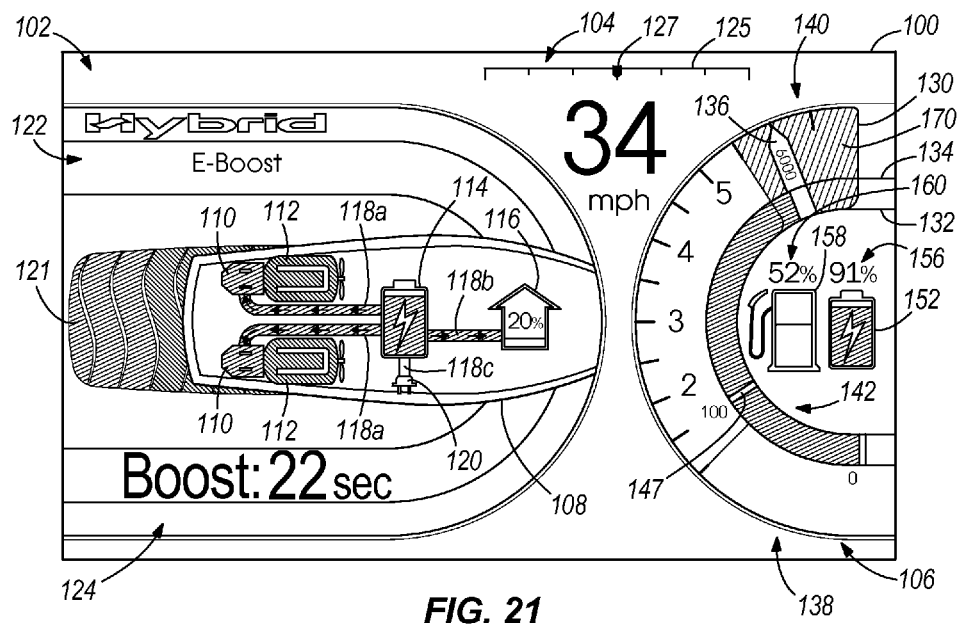
FIG. 21 depicts another example of the multifunctional display when the propulsion system is operating in the electric boost operational mode.
Figure 22:
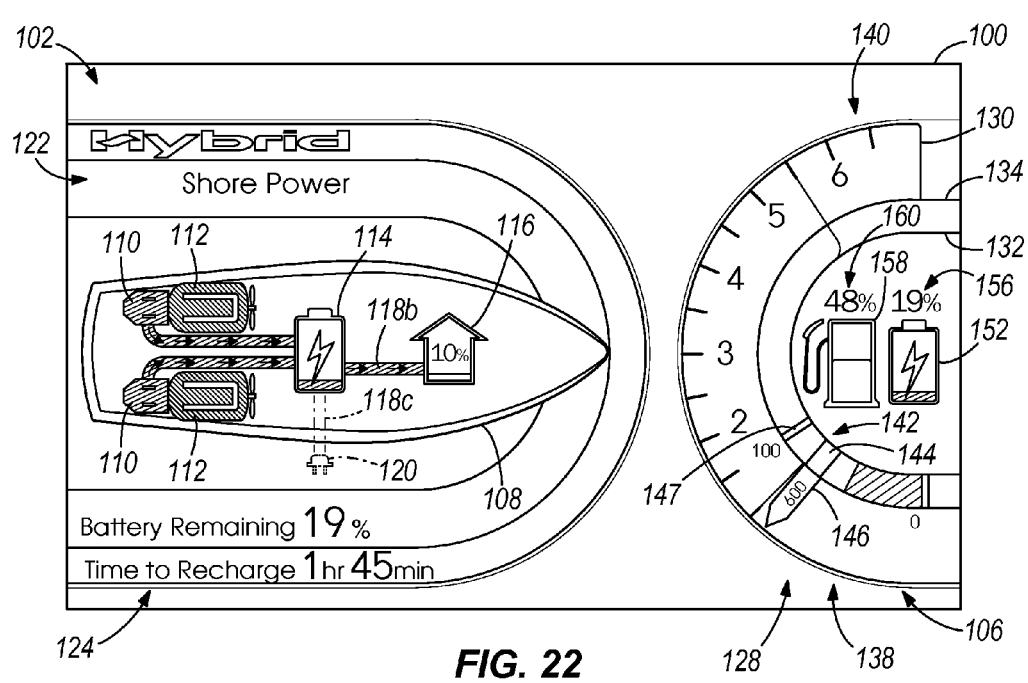
FIG. 22 depicts another example of the multifunctional display when the propulsion system is operating in the shore power operational mode.

FIGS. 20-22 depict further examples of the display 100 during operation of the propulsion system in the above described operational modes. FIG. 20 depicts the display 100 during low speed operation of the propulsion system 30 under engine operational mode. In this case, output from the engine 38 can be applied to the propulsor 34, as well as employed to charge the battery 46 via the motor 36. As shown in FIG. 20, the wake icon 121 is colored the noted first color to indicate that the engine 38 is providing power to the propulsor 34. The motor icons 110 and conduits 118*a* are colored the third color (e.g. green) to indicate that the motor 36 is providing charge to the battery 46. The directional marker 136 is located along the first portion 138 of the sequential indicator 128 to indicate a relatively low rotations per minute of the engine 38. The first portion 138 of sequential indicator 128 can be progressively colored the noted third color between the inner and outer arcuate sides 132, 134 to indicate that the battery 46 is being charged by the motor 36. Battery icon 114 and charge level icon 152 can be progressively colored the third color to indicate charging of the battery 46.

FIG. 21 depicts the display 100 during operation of the propulsion system 30 under the electric boost operational mode, and particularly at a wide open throttle condition wherein the speed of engine 38 exceeds a threshold, such as for example 5,500. Location 124 indicates an amount of available time of boost. A colorized RPM zone 170 is displayed on the second portion 140 of the indicator 128. The color of the zone 170 can intensify or otherwise change as the speed of the engine 138 increases.

FIG. 22 depicts the display 100 during operation of the propulsion system under the noted shore power operational mode. In this example, the engines 38 are operated to provide power to recharge the battery 46 instead of or in addition to the shore power connection. The engine icons 112 are colored the noted first color. The motor icons 110 and conduits 118*a* are also colored the noted third color to indicate to the user that the battery 46 is being charged. The battery icon 114 is also progressively colored the third color to indicate the amount of charging that has occurred. The time to fully recharge the battery 46 and the amount of battery remaining in percentage is provided at location 124. Even though the marine vessel 32 is stationary, the directional marker 136 shows the present speed of the engine 38 during the charging process. The dial 130 is progressively colored the third color to indicate that charging is under way.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means plus function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the inventors not to invoke 35 U.S.C. §112, paragraph six, for any limitations of any of the claims herein, except for those in which the claim expressly uses the words "means for" together with an associated function.

What is claimed is:

1. A multifunctional display for a propulsion system of a marine vessel, the multifunctional display comprising:
    a sequential, indicator comprising a first portion, a second portion, and a transitional portion between the first portion and the second portion,
    the first portion depicting changes in a characteristic of a first component of the propulsion system during a first operational mode of the propulsion system,
    the second portion depicting changes in a characteristic of a second component of the propulsion system during a second operational mode of the propulsion system, and
    the transition portion depicting a change in operation of the propulsion system between the first operational mode and the second operation mode;
    a marine vessel icon having a first icon simultaneously depicting the changes in the characteristic of the first component of the propulsion system during the first operational mode of the propulsion system, and a second icon simultaneously depicting the changes in the characteristic of the second component of the propulsion system during the second operational mode of the propulsion system;
    wherein the marine vessel icon changes position with respect to the multifunctional display when the propulsion system changes from one of the first operational mode and second operational mode to the other of the first operational mode and second operational mode.

2. A multifunctional display according to claim 1, wherein the sequential indicator displays a first color representing the characteristic of the first component and displays a second color representing the characteristic of the second component.

3. A multifunctional display according to claim 1, comprising a directional marker that moves along the first portion of the sequential indicator to depict changes in the characteristic of the first component of the propulsion system, and that also moves along the second portion of the sequential indicator to depict changes in the characteristic of the second component of the propulsion system, and that also crosses over the transition portion between the first and second portions to depict the change in operation of the propulsion system between the first and second operational modes.

4. A multifunctional display according to claim 3, wherein the directional marker comprises a needle.

5. A multifunctional display according to claim 3, wherein the directional marker comprises a first portion that moves along the sequential indicator to depict said changes in the characteristic of the first component and a second portion that moves along the sequential indicator to depict said changes in the characteristic of the second component.

6. A multifunctional display according to claim 5, wherein the first and second portions of the directional marker move along both of the first and second portions of the sequential indicator.

7. A multifunctional display according to claim 3, wherein the sequential indicator comprises a linear pathway.

8. A multifunctional display according to claim 7, wherein the linear pathway comprises a curvilinear dial.

9. A multifunctional display according to claim 8, wherein the dial comprises inner and outer arcuate sides.

10. A multifunctional display according to claim 9, comprising sequential numerical indicia spaced apart along the dial.

11. A multifunctional display according to claim 9, wherein the directional marker has a first inner end that is adjacent the inner arcuate side of the dial and a second outer end that extends outwardly from the outer arcuate side of the dial.

12. A multifunctional display according to claim 11, wherein the directional marker comprises a first portion that moves along the sequential indicator to depict said changes in the characteristic of the first component and a second portion that moves along the sequential indicator to depict said changes in the characteristic of the second component.

13. A multifunctional display according to claim 1, wherein the propulsion system is a hybrid propulsion system and wherein the first component is an electric motor and the second component is an internal combustion engine; and wherein the characteristic of the first component comprises an output of the motor and wherein the characteristic of the second component comprises a speed of rotation of the internal combustion engine.

14. A multifunctional display according to claim 13, comprising a charge level icon displaying changes in a charge level of a battery powering the motor.

15. A multifunctional display according to claim 14, wherein changes in the charge level of the battery powering the motor are displayed by changes in color of the charge level icon.

16. A multifunctional display according to claim 14, comprising an arrow adjacent the charge level icon, the arrow being displayed in one direction to indicate an increasing charge level of the battery and being displayed in another direction to indicate a decreasing charge level in the battery.

17. A multifunctional display according to claim 14, comprising numerical indicia adjacent the charge level icon displaying changes in charge level of the battery.

18. A multifunctional display according to claim 13, comprising a fuel level icon displaying changes in an amount of fuel in the internal combustion engine.

19. A multifunctional display according to claim 18, wherein changes in the amount of fuel in the internal combustion engine are displayed by changes in color of the fuel level icon.

20. A multifunctional display according to claim 18, comprising numerical indicia adjacent the fuel level icon displaying changes in fuel level of the internal combustion engine.

21. A multifunctional display according to claim 1, comprising a wake icon indicating said change in operational mode of the propulsion system.

22. A multifunctional display according to claim 21, wherein the wake icon is located aft of the marine vessel icon.

23. A multifunctional display according to claim 21, wherein the wake icon changes in appearance upon a change in operational mode of the propulsion system.

24. A multifunctional display according to claim 21, wherein the wake icon changes color upon a change in operational mode of the propulsion system.

25. A multifunctional display according to claim 1, wherein the propulsion system is a hybrid propulsion system and wherein the first icon comprises a motor icon and the first component comprises an electric motor, and wherein the second icon comprises an engine icon and the second component comprises an internal combustion engine.

26. A multifunctional display according to claim 25, wherein the marine vessel further comprises a third, battery icon depicting changes in a characteristic of a battery powering the motor.

27. A multifunctional display according to claim 26, comprising conduits extending between the battery icon, the motor icon, and the engine icon, the conduits displaying a transfer of energy between the battery, motor and engine during operation of the propulsion system.

28. A multifunctional display according to claim 27, wherein the conduits change in appearance based upon a direction of the transfer of energy.

29. A multifunctional display according to claim 27, comprising a wake icon actively displaying said change in operational mode of the propulsion system, wherein the wake icon and conduits change a same color based upon the change in operational mode of the propulsion system.

* * * * *